United States Patent
Kattepur et al.

(10) Patent No.: US 10,235,642 B2
(45) Date of Patent: Mar. 19, 2019

(54) METHOD AND SYSTEM FOR OPTIMALLY ALLOCATING WAREHOUSE PROCUREMENT TASKS TO DISTRIBUTED ROBOTIC AGENTS

(71) Applicant: Tata Consultancy Services Limited, Mumbai (IN)

(72) Inventors: Ajay Kattepur, Bengaluru (IN); Hemant Kumar Rath, Bhubaneswar (IN); Anantha Simha, Bangalore (IN); Arijit Mukherjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/827,513

(22) Filed: Nov. 30, 2017

(65) Prior Publication Data

US 2019/0049975 A1 Feb. 14, 2019

(30) Foreign Application Priority Data

Aug. 11, 2017 (IN) .............................. 201721028709

(51) Int. Cl.
*G06Q 10/04* (2012.01)
*G05B 19/418* (2006.01)
(Continued)

(52) U.S. Cl.
CPC ....... *G06Q 10/04* (2013.01); *G05B 19/41865* (2013.01); *G05B 19/41895* (2013.01);
(Continued)

(58) Field of Classification Search
CPC .............................. G06Q 1/04; G05B 19/41895
See application file for complete search history.

(56) References Cited

U.S. PATENT DOCUMENTS 9,513,627 B1 * 12/2016 Elazary ............ G05B 19/41865
9,637,310 B1 * 5/2017 Zou ...................... G05D 1/0297
(Continued)

OTHER PUBLICATIONS

Terelius H. et al. (Jan. 2011). "Decentralized Multi-Agent Optimization via Dual Decomposition." *IFAC World Congress, IFAC Proceedinga Volumes*, vol. 44, issue 1; pp. 11245-11251.
(Continued)

*Primary Examiner* — Thomas Randazzo
(74) *Attorney, Agent, or Firm* — Finnegan, Henderson, Farabow, Garrett & Dunner LLP

(57) ABSTRACT

This disclosure relates generally to autonomous devices, and more particularly to method and system to optimally allocate warehouse procurement tasks to distributed autonomous devices. The method includes obtaining, at a coordinating agent, a global task associated with the warehouse and information associated with the robotic agents. The information includes a count and status of the robotic agents. The global task is profiled to obtain a set of sub-tasks and constraints associated with the set of sub-tasks are identified. The constraints include utilization constraint and/or pricing constraints. A distributed, decentralized optimal task allocation is performed amongst the robotic agents based on constraints to obtain optimal performance of robotic agents. The distributed optimal task allocation includes performing primal or dual decomposition of the set of sub-tasks by each robotic agent and updating corresponding primal/dual variables by the coordinating agent when the optimization is performed based on utilization constraint and pricing constraints, respectively.

18 Claims, 6 Drawing Sheets

(51) Int. Cl.
  *G05D 1/02* (2006.01)
  *G06Q 10/08* (2012.01)
(52) U.S. Cl.
  CPC ......... *G05D 1/0217* (2013.01); *G05D 1/0291* (2013.01); *G06Q 10/087* (2013.01); *G05B 2219/39146* (2013.01); *G05B 2219/39167* (2013.01); *G05D 2201/0216* (2013.01)

(56) References Cited

U.S. PATENT DOCUMENTS

| | | | | |
|---|---|---|---|---|
| 2014/0342834 | A1* | 11/2014 | Tappeiner | A63H 30/04 |
| | | | | 463/42 |
| 2017/0235316 | A1* | 8/2017 | Shattil | B64C 39/024 |
| | | | | 701/3 |
| 2018/0075402 | A1* | 3/2018 | Stadie | B65G 1/0464 |
| 2018/0108102 | A1* | 4/2018 | Kapuria | B65G 1/0492 |
| 2018/0158016 | A1* | 6/2018 | Pandya | G06Q 10/087 |
| 2018/0182054 | A1* | 6/2018 | Yao | G06Q 50/28 |
| 2018/0188747 | A1* | 7/2018 | Venturelli | G08G 5/0069 |

OTHER PUBLICATIONS

Kim, B-In, et al. (Dec. 2003). "A Hybrid Scheduling and Control System Architecturefor Warehouse Management," *IEEE Transactions on Robotics and Automation*, vol. 19, issue 6; pp. 991-1001.

* cited by examiner

METHOD AND SYSTEM FOR OPTIMALLY ALLOCATING WAREHOUSE PROCUREMENT TASKS TO DISTRIBUTED ROBOTIC AGENTS

PRIORITY CLAIM

This U.S. patent application claims priority under 35 U.S.C. § 119 to: India Application No. 201721028709, filed on Aug. 11, 2017. The entire contents of the aforementioned application are incorporated herein by reference.

TECHNICAL FIELD

This disclosure relates generally to generally relate to autonomous devices and more particularly to method and system to optimally allocate warehouse procurement tasks to distributed autonomous devices, such as robotic agents.

BACKGROUND

Background on Conventional Systems.

The inventors here have recognized several technical problems with such conventional systems, as explained below.

Robotic automation is being increasingly proselytized in the industrial and manufacturing sectors to increase production efficiency. Typically, complex industrial tasks cannot be satisfied by individual robots, rather coordination and information sharing is required.

Integration of robotics, cyber-physical systems and the cloud has come to the forefront with Industry 4.0 requirements. Industry 4.0 proposes a "smart factory" solution, wherein modular cyber-physical systems coordinate to make decentralized decisions. Some of the key requirements for Industry 4.0 include interoperability, information transparency, technical assistance and decentralized decisions.

Warehouse and factory floor automation has been explored with respect to these requirements. Herein, Automated Guided Vehicles (AGVs) are employed in the warehousing environment to move products from one place to another by using networked robotics or cloud robotics. However, a centralized robotic control and coordination of such AGVs is ill-advised in such settings, due to high failure probabilities, inefficient overheads and lack of scalability.

SUMMARY

Embodiments of the present disclosure present technological improvements as solutions to one or more of the above-mentioned technical problems recognized by the inventors in conventional systems. For example, in one embodiment, a processor-implemented method to optimally allocate warehouse procurement tasks to distributed robotic agents is provided. The method includes obtaining, at a coordinating agent of a plurality of robotic agents, a global task associated with the warehouse and an information associated with the plurality of robotic agents available for the global task, via one or more hardware processors. Said information includes a count and status of the plurality of robotic agents. Further the method includes profiling the global task to obtain a set of sub-tasks and identifying one or more constraints associated with the set of sub-tasks, via the one or more hardware processors. A constraint of the one or more constraints includes one of a utilization constraint and one or more pricing constraints. Furthermore, the method includes performing, via the one or more hardware processors, distributed, decentralized optimal task allocation amongst the plurality of robotic agents based at least on the one or more constraints, to obtain optimal performance of the plurality of robotic agents in accomplishment of the global task. The distributed optimal task allocation include performing a primal decomposition of the set of sub-tasks by each robotic agent of the plurality or robotic agents and updating a set of corresponding primal variables by the coordinating agent when the optimization is performed based on a utilization constraint. In addition, the distributed optimal task allocation includes performing a dual decomposition of the set of sub-tasks when the optimization is performed based on one or more pricing constraints, and updating a set of corresponding dual variables by the coordinating agent.

In another embodiment, system for optimally allocating warehouse procurement tasks to distributed robotic agents is provided. The system includes one or more memories storing instructions; and one or more hardware processors coupled to the one or more memories. Said one or more hardware processors are configured by said instructions to obtain, at a coordinating agent of a plurality of robotic agents, a global task associated with the warehouse and an information associated with the plurality of robotic agents available for the global task, said information comprising a count and status of the plurality of robotic agents. The one or more hardware processors are further configured by the instructions to profile the global task to obtain a set of sub-tasks and identifying one or more constraints associated with the set of sub-tasks, a constraint of the one or more constraints comprises one of a utilization constraint and one or more pricing constraints. Furthermore, the one or more hardware processors are further configured by the instructions to perform distributed, decentralized optimal task allocation amongst the plurality of robotic agents based at least on the one or more constraints, to obtain optimal performance of the plurality of robotic agents in accomplishment of the global task. In an embodiment, the distributed optimal task allocation includes performing a primal decomposition of the set of sub-tasks by each robotic agent of the plurality or robotic agents and updating a set of corresponding primal variables by the coordinating agent when the optimization is performed based on a utilization constraint. In another embodiment, the distributed optimal task allocation includes performing a dual decomposition of the set of sub-tasks when the optimization is performed based on one or more pricing constraints, and updating a set of corresponding dual variables by the coordinating agent.

In yet another embodiment, there is provided a computer program product comprising a non-transitory computer readable medium having a computer readable program embodied therein, wherein the computer readable program, when executed on a computing device, causes the computing device to perform a method, wherein the method includes obtaining, at a coordinating agent of a plurality of robotic agents, a global task associated with the warehouse and information associated with the plurality of robotic agents available for the global task. Said information includes a count and status of the plurality of robotic agents. Further, the method includes profiling the global task to obtain a set of sub-tasks and identifying one or more constraints associated with the set of sub-tasks. A constraint of the one or more constraints includes one of a utilization constraint and one or more pricing constraints. Furthermore, the method includes performing, distributed, decentralized optimal task allocation amongst the plurality of robotic agents based at least on the one or more constraints, to obtain optimal performance of the plurality of robotic agents in accomplishment of the global task. The distributed optimal task allocation include performing a primal decomposition of the set of sub-tasks by each robotic agent of the plurality or robotic agents and updating a set of corresponding primal variables by the coordinating agent when the optimization is performed based on a utilization constraint. In addition, the distributed optimal task allocation includes performing a dual decomposition of the set of sub-tasks when the optimization is performed based on one or more pricing constraints, and updating a set of corresponding dual variables by the coordinating agent.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
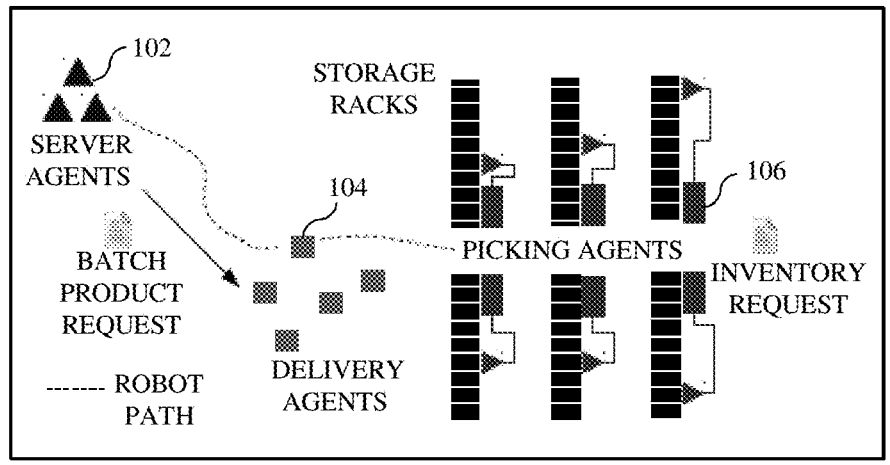
FIG. 1A illustrates a multi-agent system deployed in a warehouse, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Autonomous robots (or robotic agents) are being deployed in multiple environments including home automation, smart manufacturing, healthcare and disaster management. Recently, warehouse and factory floor automation has been explored with respect to the Industry 4.0 requirements including interoperability, information transparency, technical assistance, and decentralized decisions. For example, Automated Guided Vehicles (AGVs) are employed in the warehousing environment to move products from one place to another. AGVs follow fixed routes (using wires or markers) that are pre-programmed on them. As AGVs have limited on board computational intelligence, networked robotics may be utilized, where robotic AGVs may link to an internet based infrastructure to seamlessly exchange data. Said data may be autonomously exchanged or coordinated via a central control station. The infrastructure can be extended to Cloud Robotics framework, where robots make use of the cloud to coordinate or offload computational tasks.

In warehouses that may have hundreds of robots on the shop floor, complex problem domains, such as scheduling, optimization, and planning, require modular and scalable solutions. A number of functional, modular components (agents) may be deployed to solve specialized problem aspects. Decomposing large problems allows agents to autonomously solve problem subsets, without relying on a failure prone central controller. When there are interdependencies among sub-problems, coordination amongst robotic agents can ensure solutions to the global problems.

Multi-agent systems are typically employed to model interactions between heterogeneous, distributed and mobile communicating devices. This serves as an effective modeling approach when dealing with networked robotic devices that autonomously cooperate to complete tasks. Multi-agent deployments are suitable for real-time distributed control in dynamic and distribution prone environments. Important requirements of Industry 4.0 including information transparency and decentralized decision making are satisfied by multi-agent systems.

Due to the decomposition of tasks to agents, the typical AGV dependent warehouses can be upgraded with robotic Autonomous Mobile Robot (AMR) deployments. AMRs have more powerful on-board computational power that can understand dynamically changing environments, produce a real-time map of surroundings and efficiently plan paths to destinations. In warehousing environments where there are dynamic variations in demand and supply of inventory, assigning tasks to robotic AMR agents can be modeled as optimization problems. Typically, such optimizations are solved at a central entity such as Warehouse Management Systems, which are neither scalable nor can handle autonomous entities.

Various embodiments of the present disclosure provide a multi-agent based architecture for a warehouse environment, using which the centralized optimization problem can be distributed. The disclosed system makes use of primal and dual decomposition techniques to distribute the resource optimization problem among multiple robotic agents. The disclosed embodiments provides method and system for application of autonomous robotic agents in a distributed optimization framework, so as to solve problems including minimizing overall procurement latency and maximizing utilization of robotic agents. In addition, the disclosed distributed optimization system is fault tolerant in nature, striving for completion of tasks, despite robotic failures.

FIG. 1A illustrates a multi-agent system 100 deployed in a warehouse, in accordance with the embodiments of the present disclosure. Multi-agent systems are a group of agents deployed with specific architecture, coordination and messaging protocols. Each agent senses/actuates based on data computed from its own field of view. Typically, the autonomous agents have incomplete information and limited viewpoints of a global problem. As there is no global control or central daemon available, coordination among agents is needed in a multi-agent system. Consensus on the global task may be provided by sharing knowledge among agents in a peer-to-peer or hierarchical fashion. Data is also decentralized as agents may sense, store and perform decision updates periodically.

In multi-agent based system, when considering such agent based deployments for robotics, partitioning distributed device clusters as agents may be performed by physical distinction, encapsulation, ownership and resource allocation. In physical distinction, each robot is considered as an agent. In encapsulation, every agent is encapsulated with enough information to complete a sub-task. According to ownership, only a few agents have permissions to modify data. Partitioning of the distributed device clusters by resources involves allocating limited resources (computation time, carrying capacity, network bandwidth) to a few robots that can correspond to agents.

Referring to FIG. 1A, the multi-agent system 100 is shown to include specialized robotic agents spawned within a warehouse to automate delivery of products. A set of server agents $A_S$ (collectively marked as 102) tabulate the task requirements (product list); a set of mobile delivery agents $A_D$ (collectively marked as 104) are employed to subdivide/allocate delivery tasks and a set of picking agents $A_P$ (collectively marked as 106) are located close to the shelves to pick and drop items. Inventory is monitored using RFID tags through periodically polling, such that replacement of inventory is done periodically ($A_S$, $A_P$ crosschecks). Properties of physical distinction, encapsulation and resource allocation amongst these agents are preset.

Once a set of products are to be procured by the server agent $A_S$, the products are subdivided based on dimensions (length, breadth, weight) and location coordinates (rack, row, column). These are then assigned to the delivery agents $A_D$ that have a limited capacity of battery lifetime, load bearing capacity and load bearing dimensions. The delivery robots $A_D$ then approach the picker robots/agents $A_P$ to procure specific items in the provided list. The picker agents $A_P$ detect the proximity of delivery robots and picks/drops the required products. After procuring the items, the server robot $A_S$ updates the inventory list about decrease in stocks of a particular inventory item. This delivery process requires handling of dynamic variations in demand and location of delivery robots.

While in the computational setting, resources may include CPU cycles, memory, network and battery capacities, in case of such cyber-physical interactions, allocating tasks with physical and environmental constraints is also important. Rather than processing each order individually, the server agent $A_S$ may queue up a batch of tasks that need to be completed. These tasks may be sub-divided among multiple delivery and picking agents to optimize procurement of products across multiple warehouse racks.

The process of division/allocation of delivery tasks can occur in multiple modes including utilization of delivery agents, procurement latency, and energy limitation. In the 'utilization of delivery agent's' mode, the tasks are subdivided such that utilization of individual agents are maximized. Each agent makes a choice as to participate or abstain from the procurement process (based on constraints). In the 'procurement latency' mode, the autonomous delivery robots must coordinate amongst themselves to procure the set of items within a given latency constraint. In 'energy limitation' mode, the delivery robots accept tasks as long as overall battery degradation of each agent is minimized.

Figure 1B:
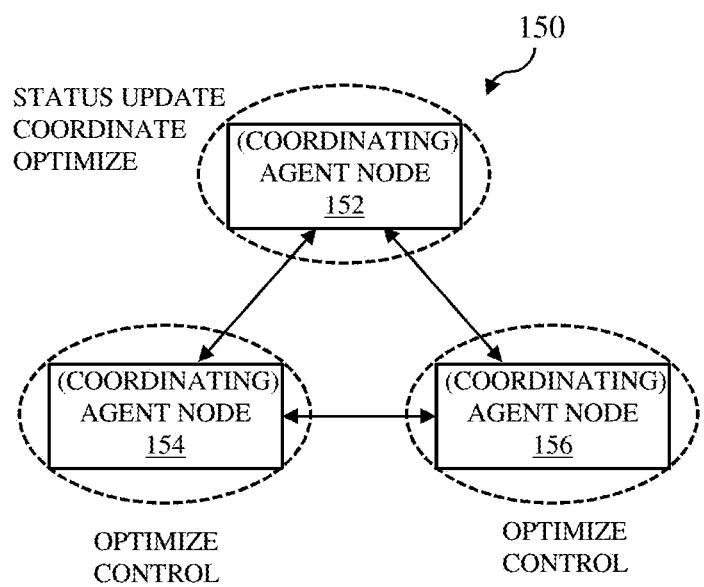
FIG. 1B illustrates a decentralized multi-agent system deployed in a warehouse, according to some embodiments of the present.

In a decentralized multi-agent system, the process of division/allocation of delivery tasks is performed in a decentralized manner, with agents coordinating with each other to collaboratively conclude a global task. An example of a decentralized multi-agent system is illustrated with reference to FIG. 1B. Referring to FIG. 1B, the decentralized multi-agent system 150 is shown to include multiple agent nodes, such as 152, 154, and 156. Out of such multiple agent nodes, one of the nodes acts as a coordinating agent. For example, in the present scenario, the agent 152 is shown as the coordinating node that is capable of division/allocation of delivery tasks among remaining agent nodes (or robotic agents). The coordinating agent is capable of providing status update of the agent nodes, coordinate among the remaining agent nodes, and optimize the task allocation thereto. The other agent nodes (or robotic agents) are capable of optimizing and controlling the tasks allocated thereto in a decentralized multi-agent system. For example, the coordinating agent provides an update of constraints to remaining robotic agents based on global task constraints. The remaining robotic agents perform optimization based on the updates received from the coordinating agent. The details of multi-agents system along with the optimal allocation of warehouse procurement tasks to distributed robotic agents is described further with reference to FIGS. 2 to 10.

The method(s) and system(s) for optimal allocation of warehouse procurement tasks to distributed robotic agents are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Figure 2:
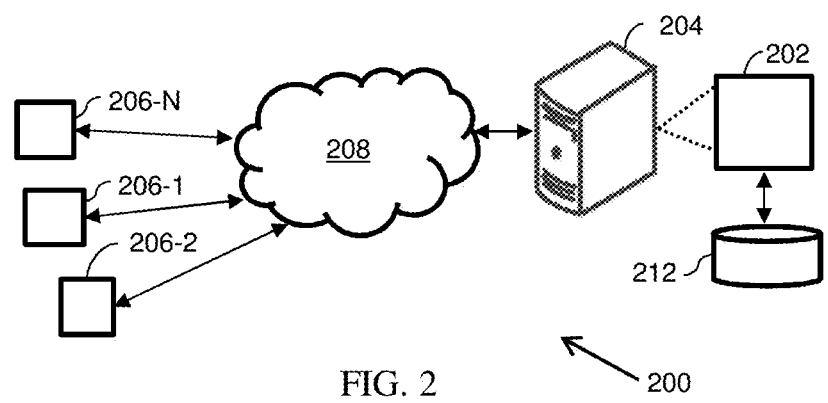
FIG. 2 illustrates a networking environment implementing system for optimal allocation of warehouse procurement tasks to distributed robotic agents, according to some embodiments of the present disclosure.

FIG. 2 illustrates a networking environment implementing system for optimal allocation of warehouse procurement tasks to distributed robotic agents, in accordance with an embodiment of the present subject matter. In an embodiment, the system 202 is capable of performing distributed, decentralized optimal task allocation amongst the plurality of robotic agents based at least on the one or more constraints, to obtain optimal performance of the plurality of robotic agents in accomplishment of a global task.

Although the present disclosure is explained considering that the system 202 is implemented on a server, it may be understood that the system 202 may also be implemented in a variety of computing systems, such as a laptop computer, a desktop computer, a notebook, a workstation, a cloud-based computing environment such as a robotic cloud environment, Fog or edge computing environment and the like. It will be understood that the system 202 may be accessed by multiple autonomous robotic devices (or agent nodes) 206-1, 206-2 . . . 206-N, collectively referred to as robotic agents 206 hereinafter, or applications residing on the robotic agents 206. Examples of the robotic agents 206 may include, but are not limited to, a portable computer, a personal digital assistant, a handheld device, a Smartphone, a Tablet Computer, a workstation, industrial controllers, switches, routers, embedded servers, and the like. The robotic agents 206 are communicatively coupled to the system 202 through a network 208.

In an embodiment, the network 208 may be a wireless or a wired network, or a combination thereof. In an example, the network 208 can be implemented as a computer network, as one of the different types of networks, such as virtual private network (VPN), intranet, local area network (LAN), wide area network (WAN), the internet, and such. The network 206 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 208 may include a variety of network devices, including routers, bridges, servers, computing devices, storage devices. The network devices within the network 208 may interact with the system 202 through communication links.

The system 202 is capable of applying distributed optimization so that the robotic agents can coordinate among themselves using said distributed optimization techniques to allocate tasks within warehouses. Accordingly, the system may include multiple robotic agents such as server agent, delivery agents and picking agents, as described previously. From amongst the deliver agents, the one of the robotic agent may be selected as a coordinating agent for a set of delivery agents so as to perform the coordination and optimization of tasks assigned to the set of delivery agents. The functions of coordinating agents pertaining to the coordination and optimization of tasks are explained further in the description below. In an embodiment, the system 202 models division of tasks to the robotic agents based on constraints including agent utilization, procurement latency, energy depletion rates and fault tolerance capabilities.

As discussed above, the system 202 may be implemented in a computing device 204, such as a hand-held device, a laptop or other portable computer, a tablet computer, a mobile phone, a PDA, a smartphone, and a desktop computer. The system 202 may also be implemented in a workstation, a mainframe computer, a server, and a network server. In an embodiment, the system 202 may be coupled to a data repository, for example, a repository 212. The repository 212 may store data processed, received, and generated by the system 202. In an alternate embodiment, the system 202 may include the data repository 212. The components and functionalities of the system 202 are described further in detail with reference to FIG. 3.

Figure 3:
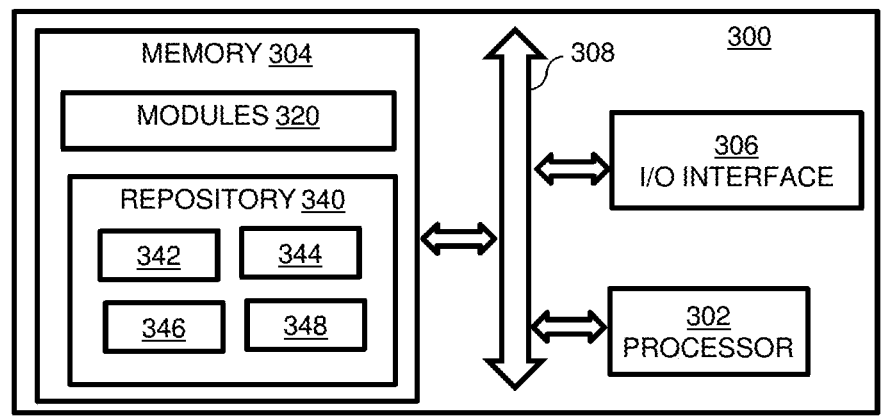
FIG. 3 illustrates a block diagram of a system for optimal allocation of warehouse procurement tasks to distributed robotic agents, according to some example embodiments of the present disclosure.

FIG. 3 illustrates a block diagram of a system for optimal allocation of warehouse procurement tasks to distributed robotic agents, in accordance with an example embodiment. The system 300 may be an example of the system 202 (FIG. 2). In an example embodiment, the system 300 may be embodied in, or is in direct communication with the system, for example the system 202 (FIG. 2). In an embodiment, the system 300 facilitates optimal allocation of warehouse procurement tasks to distributed robotic agents by utilizing optimization techniques such as primal optimization and dual optimization that may consider constraints such as utilization of robotic agent, procurement latency, energy depletion rates and fault tolerance capabilities. The system 300 includes or is otherwise in communication with one or more hardware processors such as a processor 302, one or more memories such as a memory 304, and an I/O interface 306. The processor 302, the memory 304, and the I/O interface 306 may be coupled by a system bus such as a system bus 308 or a similar mechanism.

The I/O interface 306 may include a variety of software and hardware interfaces, for example, a web interface, a graphical user interface, and the like The interfaces 306 may include a variety of software and hardware interfaces, for example, interfaces for peripheral device(s), such as a keyboard, a mouse, an external memory, a camera device, and a printer. Further, the interfaces 306 may enable the system 300 to communicate with other devices, such as web servers and external databases. The interfaces 306 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 306 may include one or more ports for connecting a number of computing systems with one another or to another server computer. The I/O interface 306 may include one or more ports for connecting a number of devices to one another or to another server.

The hardware processor 302 may be implemented as one or more microprocessors, microcomputers, microcontrollers, digital signal processors, central processing units, state machines, logic circuitries, and/or any devices that manipulate signals based on operational instructions. Among other capabilities, the hardware processor 302 is configured to fetch and execute computer-readable instructions stored in the memory 304. In an embodiment, the processor 302 is configured by the instructions stored in the memory, thereby causing the system 300 to perform various functions, as described later in the description below.

The memory 304 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 304 includes a plurality of modules 320 and a repository 340 for storing data processed, received, and generated by one or more of the modules 320. The modules 320 may include routines, programs, objects, components, data structures, and so on, which perform particular tasks or implement particular abstract data types.

The repository 340, amongst other things, includes a system database 342 and other data 344. The other data 344 may include data generated as a result of the execution of one or more modules in the modules 320. The repository 340 is further configured to maintain information 346 associated with the plurality of robotic agents available for the global and computation data 348 associated with the computation of primal and dual distribution of sub-tasks. The information 346 and the computation data 348 will be explained further in the description below.

According to the present subject matter, the system 300 represents a framework for optimal allocation of warehouse procurement tasks to distributed robotic agents. Herein, the term 'robotic agents' refers to autonomous computational entities/devices that can sense information, compute reactions and coordinate with other robotic agents. The procurement task may be a global task to be performed by the plurality of robotic agents in the warehouse environment. The warehouse deploys a plurality of autonomous agents that are configured to automate the global task, i.e. delivery of the products. The plurality of autonomous agents includes at least one server agent to allocate the global task, a plurality of robotic agents including a plurality of delivery agents and a plurality of picker agents for performing the global task. The plurality of delivery agents includes a set of coordinating agents for coordination among remaining of the plurality of delivery agents to allocate the task to the delivery agents. For example, in case there are fifty delivery agents, then few of those fifty for instance, five delivery agents can selected as coordinating agents that may be responsible for coordinating among remaining forty-five delivery agents. Herein, it will be noted that a coordinating agent is one of a delivery agents with different roles and responsibilities than those of other delivery agents. Particularly, the responsibility of the coordinating agent is to update global constraint to other delivery agents, as will be explained further in the description.

The server agent is capable of selecting a set of tasks from a task queue. Each task of the set of tasks corresponds to a set of items to be procured from or dropped to a location in the warehouse. Herein, each item among the set of items is associated with corresponding item dimensions, weight and location coordinates. The server agent creates an aggregated list of the set of items associated with each task. The server agent further categorizes the aggregated list into a set of item lists based on the item dimensions and/or weight and the location coordinates of each item. Finally, the server agent forwards a set of sub-tasks associated with the set of item lists to the plurality of delivery agents. Each sub-task among the set of sub-tasks corresponds to procuring and/or dropping items from an item list from the set of item list. The plurality of delivery agents are employed to subdivide/allocate delivery tasks. As discussed previously, the plurality of delivery agents includes a set of coordinating agents that are responsible for subdividing/allocating the sub-tasks. The set of delivery agents have a limited capacity of battery lifetime, load bearing capacity and load bearing dimensions.

The remaining delivery agents/robots $A_D$ then approach the picker agent/robots $A_P$ to procure specific items in the provided list. The picker agent $A_P$ detects the proximity of delivery robots and picks/drops the required products. After procuring the items, the server robot $A_S$ updates the inventory list about decrease in stocks of a particular inventory item. Inventory is monitored using Radio Frequency Identification (RFID) tags through periodically polling, such that replacement of inventory is done periodically ($A_S$, $A_P$ cross-checks). Said delivery process requires handling of dynamic variations in demand and location of delivery robots. The disclosed system is capable of allocating tasks with physical and environmental constraints. For instance, rather than processing each order individually, the server agent may queue up a batch of tasks that need to be completed. These tasks may be sub-divided among multiple delivery and picking agents to optimize procurement of products across multiple warehouse racks. The functions of the system 300 for optimal allocation of warehouse procurement tasks to distributed robotic agents is described in further detail with reference to the description below.

In an embodiment, the system 300 causes the coordinating agent to receive a global task associated with the warehouse and information associated with the plurality of robotic agents available for the global task. The information associated with the plurality of robotic agents may include a count and status of the plurality of robotic agents. The status of the robotic agents may include information such as location, capacity, energy levels, and so on associated with the robotic agents.

The system 300 profiles the global task to obtain a set of sub-tasks. In an embodiment, profiling of the global task refers identifying various sub-tasks from the global task. For instance, the global task may include procurement of different number of pieces of ten different items from the warehouse. Said items may be placed at different locations in the warehouse, and hence in order to make the procurement task effective and efficient, it may be required to optimally distribute the tasks among different robotic agents. In general, the global task may be domain specific and may be done either by a domain expert or done using statistics of such jobs completed previously (e.g. how much time was taken to deliver such goods in a warehouse).

Further, the system 300 identifies one or more constraints associated with the set of sub-tasks. Herein, a constraint of the one or more constraints may include one of a utilization constraint and one or more pricing constraints. The utilization constraint may include maximization of resource utilization of the plurality of robotic agents. The one or more pricing constraints may include minimization of latency and minimization of energy usage.

For the multi-agent optimization formulation, considering m robotic agents, where robotic agent $a_i$, $i \in [1,m]$ has a local convex objective function fi(x), with fi:$R^n \to R$, and a local convex constraint set Xi (known only by the robotic agent). $x \in R^n$ represents a global decision vector that the robotic agents are collectively trying to decide on. The goal of the robotic agents is to cooperatively optimize a global objective function f(x), which is a function of local objectives:

$$f(x) = T(f_1(x), \ldots, f_m(x)) \quad (1)$$

where, T:$R^m \to R$ is a monotonically increasing convex function. The decision vector x is constrained to lie in a set $x \in C$, which is a combination of local and global constraints:

$$C = (\cap_{i=1}^m Xi) \cap Cg \quad (2)$$

where $C_g$ represents the global constraints. This model leads to the following optimization problem:

$$\min f(x) \text{ s.t. } x \in C \quad (3)$$

Herein, the process of division/allocation of delivery tasks in industrial warehouse, where the demand of products varies dynamically, a distributed optimization approach is embodied by the system 300. The system 300 embodies a decentralized model, with robotic agents coordinating with each other to solve a global problem. The optimization problems are further decomposed using primal/dual techniques to be solved by individual agents.

Building from eq. 3, a set of m agents $a_i$, $i \in [1,m]$ is considered that coordinate in order to optimize resource/task allocation. The centralized version of this optimization problem is:

$$\min \sum_{i=1}^{m} f_i \cdot a_i \quad (4)$$

$$\text{s.t.} \quad A_i \cdot a_i \leq x_i, \forall \in [1, m]$$

$$\sum_{i=1}^{m} F_i \cdot a_i \leq h$$

with the two individual sub-problems coupled by the constraints $\Sigma_{i=1}{}^m F_i \cdot a_i \leq h$, which might represent limits on shared resources.

Decomposition presents the solution for the above mentioned equation with a master algorithm and two linear programming problems solved (possibly in parallel) at each iteration. The assumption is that the constraints are separable and the local objective functions/constraints may be distributed over the agents. In an embodiment, the system utilizes decomposition techniques including Primal decomposition and Dual decomposition.

The technique of Primal Decomposition is used in case of Allocation constraint. In this decomposition technique, the coupling constraint $\Sigma_{i=1}{}^m F_i \cdot a_i \leq h$ is subdivided into two sets of individually solvable constraints dependent on a shared variable z. The individual optimizations that are solved at each agent are given below (agent am is the coordinator):

$$\min P_i = f_i \cdot a_i, \forall i \neq m \quad \min P_m = f_m \cdot a_m, i = m \quad (5)$$

$$\text{s.t.} \quad A_i \cdot a_i \leq x_i \qquad \text{s.t.} \quad A_m \cdot a_m \leq x_m$$

$$F_i \cdot a_i \leq z \qquad F_m \cdot a_m \leq h - (m-1) \cdot z$$

The master optimization that is updated and solved at the coordinating agent is min $\Sigma_{i=1}{}^m P_i$. In order to solve this update equation, the sub-gradient is given as:

$$z = z - \alpha_k(-\Sigma_{i=1}{}^{m-1} S_i + S_m) \quad (6)$$

where $S_i$ and $S_m$ are the solutions to the decomposed problems in eq. 5, with step size $\alpha_k$ The technique of dual decomposition is used in case of Pricing constraint. The dual decomposition problem makes use of Lagrange multipliers to eliminate the coupling constraint, using a decomposition variable $\lambda$.

$$\min(F_i \lambda + f_i) \cdot a_i, \forall i \in [1, m] \quad (7)$$

$$\text{s.t.} \quad A_i \cdot a_i \leq x_i$$

The master update performed at the coordinating agent is given by:

$$\lambda = (\lambda - \alpha_k(-\Sigma_{i=1}{}^m F_i \cdot S_i + h))_+ \quad (8)$$

where $S_i$ are the solutions to decomposed problems in eq. 7, $(\cdot)_+$ denotes the non-negative part of a vector and k is step size. At each step, the master algorithm sets the prices for the resources. The individual agents each optimize independently, taking into account the expense and income generated by using the resources. The master algorithm adjusts the prices such that the price for an overused resource is increased and the price for an under used resource is decreased (non-negative).

Both the primal and dual decomposition techniques make use of the sub-gradient method for distributed optimization. The sub-gradient method is a simple algorithm for minimizing a non-differentiable convex function. The sub-gradient method uses the iteration:

$$z^{k+1} = z^k - \alpha_k \cdot g(k) \quad (9)$$

Here $z^k$ is the kth iterate, g(k) is any sub-gradient of function f at $z^k$, and k>0 is the kth step size. Several step size rules may be applied including, constant step size $\alpha_k = b$ and non-summable diminishing $\alpha_k = a/\sqrt{k}$, where a>0. At each step, the best point found since the first iteration is tracked:

$$f_{best}{}^k = \min(f_{best}{}^{k-1}, f(z^k)) \quad (10)$$

The sub-gradient algorithm is guaranteed to converge to within some range of the optimal value.

In the present scenario of warehouse task procurement and allocation, where (varying) number of products need to be procured and delivered via robotic agents, the system 300 is configured to apply constraints such as maximizing utilization, minimizing procurement latency or minimizing energy consumption of resources for optimal performance of the plurality of robotic agents in accomplishment of the global task. Said optimization is decomposed using primal/dual techniques to be solved by individual robotic agents. For example, when an order with a given number of products is to be delivered from the warehouse, the agents ($A_D$, $A_S$, $A_P$) coordinate such that the procurement is satisfied. The coordination may be restricted based on parameters relating to device utilization or procurement latency. Table I describes some of the important parameters to be used.

TABLE 1

| Parameter | Description |
| --- | --- |
| $A_D, A_S, A_P$ | Delivery, Server, Picking Agent types |
| i | ID of the agent with i ∈ [1, m] |
| $a_i$ | Task allocated to the $i^{th}$ node ∈ $A_D$ |
| $U_i$ | Device utilization on node i |
| $D_i$ | Dimension of products (length × width) on node i |
| $w_i$ | Weight of products on node i |
| $l_i$ | Procurement latency for node i |
| $d_i$ | Distance to be traveled by node i |
| $v_i$ | Average velocity of node i |
| μ | Picking agent (∈ $A_p$) efficiency |
| ⟨D⟩$_i$ | Maximum Dimension Capacity of node i |
| ⟨w⟩$_i$ | Maximum Weight Capacity of node i |
| $\Delta C_i$ | Battery Depletion associated with node i |
| $C_i$ | Total Battery Capacity of node i |
| $I_i$ | Current drawn from battery for node i |
| $T_i$ | Operating Battery Temperature for node i |
| ⟨D⟩ | Total Dimensions of products to be delivered |
| ⟨w⟩ | Total Weight of products to be delivered |

Initially, the system 300 recognizes goals and whether it can be completed within constraints by an individual or group of global agents. The constraints may include maximization of utilization, minimization of procurement latency and minimization energy utilization. The system 300 may determine optimal allocation of tasks based on said constraints, as explained in the description below.

For maximum utilization constraint, when there are multiple robots on the factory floor ready for delivery, one strategy is to maximize the per-trip utilization of resources. The term 'utilization' herein refers to load bearing capacity of the robots rather than utilization of hardware (CPU, Memory, Network). The optimization may be formulated to maximize the utilization of each node, subject to maximum dimensions/weight that the node can bear. In order to deploy this optimization over agents, perform primal decomposition is performed as given below:

$$\min PB_i = U_i \cdot a_i, \forall i \neq m \quad \min PB_i = U_m \cdot a_m, \forall i = m \quad (11)$$
$$\text{s.t.} \quad D_i \cdot a_i = x \quad \text{s.t.} \quad D_m \cdot a_m = \langle D \rangle - (m-1) \cdot X$$
$$w_i \cdot a_i = Y \quad w_m \cdot a_m = \langle W \rangle - (m-1) \cdot Y$$
$$D_i \cdot a_i \leq \langle D \rangle_i \quad D_m \cdot a_m \leq \langle D \rangle_m$$
$$w_i \cdot a_i \leq \langle W \rangle_i \quad w_m \cdot a_m \leq \langle W \rangle_m$$
$$a_i \geq 0 \quad a_m \geq 0$$
$$0 \leq U_i \leq 1 \quad 0 \leq U_m \leq 1$$

Where, $\langle D \rangle_i$ and $\langle W \rangle_i$ are the maximum carrying dimensions of node i having normalized utilization Ui. In order to satisfy the primal decomposition constraints, one of the robotic agents (agent with index i=m) performs the pivot optimization satisfying the global constraint. A master update equation is performed at the coordinating agent node to update a set of corresponding primal variables (X,Y) that are used in the primal problems:

$$X = X - \alpha_k(-PA + \Sigma_i PB_i)$$

$$Y = Y - \alpha_k(-PA + \Sigma_i PB_i) \quad (12)$$

For the constraint of minimize procurement latency, as collecting products from picking stations and delivery of these products to delivery stations involves latency overheads, cases can be formulated where latency must be minimized. In the following optimization, the latency parameter $l_i$ is dependent on a number of factors including distance between picking and delivery robot $d_i$, average robot speed $v_i$ and picking efficiency $\mu$. As this reflects a pricing problem, a dual decomposition is performed as follows on all the robotic agents:

$$\min D_i \lambda_1 + w_i \lambda_2 + l_i \cdot a_i, \forall i \in [1, m] \quad (13)$$
$$\text{s.t.} \quad D_i \cdot a_i \leq \langle D \rangle_i$$
$$w_i \cdot a_i \leq \langle W \rangle_i$$
$$l_i = \frac{d_i}{v_i} + \mu$$
$$a_i \geq 0$$

where $l_i$ is the procurement latency associated with agent $a_i$.

In an embodiment, the coordinating agent updates the set of corresponding dual variables. The update equations for each of the set of dual variables $\lambda_1$ and $\lambda_2$ is based on a gradient descent method:

$$\lambda_1 = \left(\lambda_1 - \alpha_k\left(-\sum_i D_i a_i' + \langle D \rangle\right)\right)_{+'} \quad (14)$$

$$\lambda_2 = \left(\lambda_2 - \alpha_k\left(-\sum_i w_i a_i' + \langle W \rangle\right)\right)_{+'}$$

where $a_i'$ refers to solutions provided from the optimization in eq. 13.

The constraint 'minimizing the battery depletion rates' of robotic agents may also be a priority. Battery discharge lifetimes have been studied using circuit, electrochemical, stochastic or analytical models. For constant loads, the batter lifetime L can be derived from the battery capacity C and the discharge current I as L=C/I. However, modelling the discharge capacity of lithium-ion or lead acid batteries is complicated by the non-linear discharge profiles. Voltage can vary based on the discharge currents, rendering the actual battery capacity lower for high discharge currents (rate capacity effect). Additionally, during periods of low discharge, the battery can recover some of its capacity (recovery effect). The system 300 utilizes an improved version of Peukert's law that takes into account current drawn and temperature variation during battery discharge:

$$\Delta C = \gamma \cdot \left(\frac{I}{I_{ref}}\right)^\delta \cdot \left(\frac{T_{ref}}{T}\right)^\eta \quad (15)$$

where $\Delta C$ is the battery capacity consumed, Iref and Tref are the reference current and temperature rating of the battery, I and T are the current and temperature observed during battery usage, parameters $\delta$, $\eta$ are exponents relating non-linear battery depletion rates and constant $\gamma$ on A-h relates the capacity removed to the non-dimensional discharge current and temperature components. This is formulated as an optimization problem with the objective to reduce total battery consumption of participating agents using dual-decomposition:

$$\min D_i \lambda_1 + w_i \lambda_2 + \Delta C_i \cdot a_i, \forall i \in [1, m] \quad (16)$$
$$\text{s.t.} \quad D_i \cdot a_i \leq \langle D \rangle_i$$
$$w_i \cdot a_i \leq \langle W \rangle_i$$
$$\Delta C = \gamma \cdot \left(\frac{I}{I_{ref}}\right)^\delta \cdot \left(\frac{T_{ref}}{T}\right)^\eta$$
$$\Delta C_i < C_i$$
$$a_i \geq 0$$

In an embodiment, the coordinating agent updates the set of dual variables. The update equations for each of the set of dual variables $\lambda_1$ and $\lambda_2$:

$$\lambda_1 = \left(\lambda_1 - \alpha_k\left(-\sum_i D_i a_i' + \langle D \rangle\right)\right)_{+'} \quad (17)$$

$$\lambda_2 = \left(\lambda_2 - \alpha_k\left(-\sum_i w_i a_i' + \langle W \rangle\right)\right)_{+'}$$

where $a_i'$ refers to solutions provided from the optimization in eq. 16.

Figure 4:
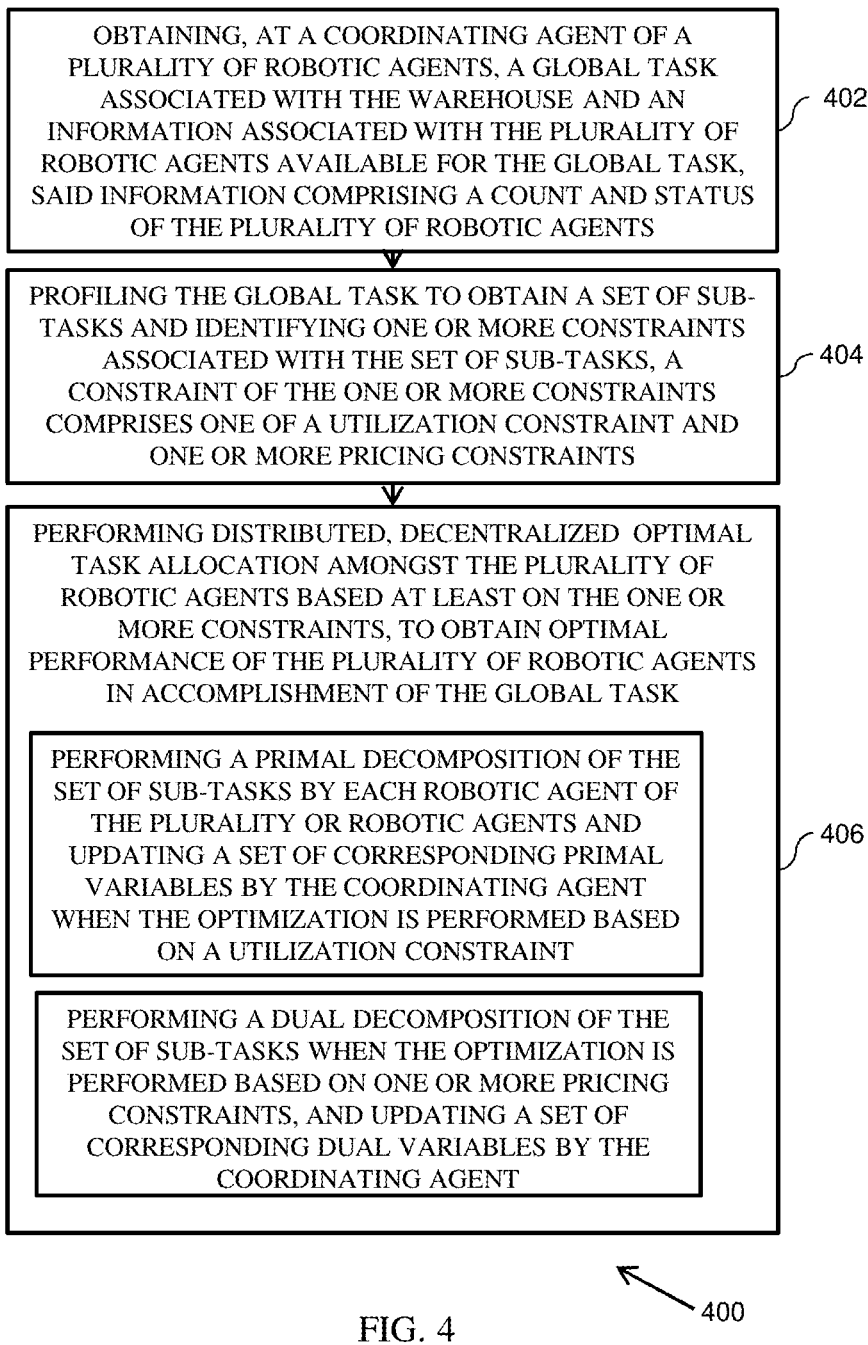
FIG. 4 is an exemplary flow diagram illustrating a computer implemented method for optimally allocating warehouse procurement tasks to distributed robotic agents, according to some embodiments of the present.

Herein, until the dual and primal variable updates are convergent, the system 300 allocates the sub-tasks to robotic agents with distributed optimization, and the robotic agents perform the sub-tasks with local constraints. Further, the dual and primal variables are updated in each iteration. Once the dual and primal variable updates converge, the robotic agents complete the task optimally and the robotic agents update status to coordinating agent. An algorithm depicting the execution of steps performed by the system for distributed optimal allocation among warehouse delivery agents is presented below:

Algorithm 1: Distributed Optimal Task Allocation Among Warehouse Delivery Robotic Agents
1 Input: Coordinating Agent with Global Task; Participating Agent Status (Number, Location, Capacity, Energy Levels); Task Constraints; Initial Update Value;
2 Profile Global Task and Related Constraints;
3 if Allocate Task then
Perform Primal Decomposition (eq. 5);
4 else
Perform Dual Decomposition (eq. 7);
5 Allocate Sub Tasks to Robotic Agents with Distributed Optimization;
6 while Update non Convergent do
7 Robotic Agents perform Optimization with Local Constraints;
8 Master Algorithm Update (eq. 6 for primal, eq. 8 for dual)
9 Robotic Agents Complete Tasks Optimally;
10 Robotic Agents Update Status to Coordinator;
11 Output: Global Task completed within Constraints;

FIG. 4 illustrates an example flow-diagram of a method 400 for optimal allocation of warehouse procurement tasks to distributed robotic agents, in accordance with an example embodiment.

At 402, the method 400 includes obtaining, at a coordinating agent of a plurality of robotic agents, a global task associated with the warehouse and information associated with the plurality of robotic agents available for the global task. The information associated the robotic agents include a count and status of the robotic agents. The status of the robotic agents may include information such as location, capacity, energy levels, and so on associated with the robotic agents.

At 404, the method 400 includes profiling the global task to obtain a set of sub-tasks and identifying one or more constraints associated with the set of sub-tasks. A constraint of the one or more constraints includes one of a utilization constraint and one or more pricing constraints.

At 406, the method 400 includes performing distributed, decentralized optimal task allocation amongst the plurality of robotic agents based at least on the one or more constraints, to obtain optimal performance of the plurality of robotic agents in accomplishment of the global task. In an embodiment, the distributed optimal task allocation includes performing a primal decomposition of the set of sub-tasks by each robotic agent of the plurality or robotic agents and updating a set of corresponding primal variables by the coordinating agent when the optimization is performed based on a utilization constraint. In another embodiment, the distributed optimal task allocation includes performing a dual decomposition of the set of sub-tasks when the optimization is performed based on one or more pricing constraints, and updating a set of corresponding dual variables by the coordinating agent. The primal decomposition and the dual decomposition of the set of sub-tasks by each robotic agent, and updating of the set of primal variable and the set of dual variable is described previously with reference to FIG. 3.

An example scenario describing optimal allocation of warehouse procurement tasks to the distributed robotic agents, for example KUKA KMP 1500 robotic agents is described further in the description below with reference to FIGS. 5-10.

Example Scenario

In an example scenario, a KUKA KMP 1500 robot is utilized as robotic agent in warehouse environment. The specifications of KMP 1500 are presented in the table II below:

| Metric | Value |
| --- | --- |
| Model | KUKA mobile platform (KMP) 1500 |
| Physical Dimensions | 2 × 0.45 × 0.8 m |
| Weight | 750 kg |
| Payload | 1500 kg |
| Max. Velocity (sideways) | 2.0 km/h |
| Max. Velocity (straight) | 3.6 km/h |
| Battery Specifications | Lithium-ion, 160 Ah, 48 V |
| Runtime | 8 hours |
| Hardware | Bodyshell, KUKA motor, rigid axle, wheel gears |
| Sensors | Laser scanners, safety/warning sensors for 360 monitoring |

The KUKA KMP 1500 robot is an autonomous platform that may be deployed on warehouse floors. By the use of safety laser scanners and wheel sensors, the robots are able to perform real time Simultaneous Localization and Mapping. This allows the omni-directional to move in any direction and achieve positioning accuracy of upto ±1 mm.

The disclosed system is utilized for applying the optimization formulations to a set of KUKA robots simulated on the warehouse floor to collect and deliver products. For the simulations, the number of delivery, picking and server agents are restricted over which the optimizations to be performed. A further assumption is that the static locations of the server $A_S$ and picking agents $A_P$ are preset with the optimization performed over picking allocations to delivery agents $A_D$. The optimizations are solved in Scilab using the Karmarkar optimization solver, setting the sub-gradient update as $\alpha_k=0.1/\sqrt{k}$. The following cases are studied with referenced to FIGS. 5-10

Figure 5:
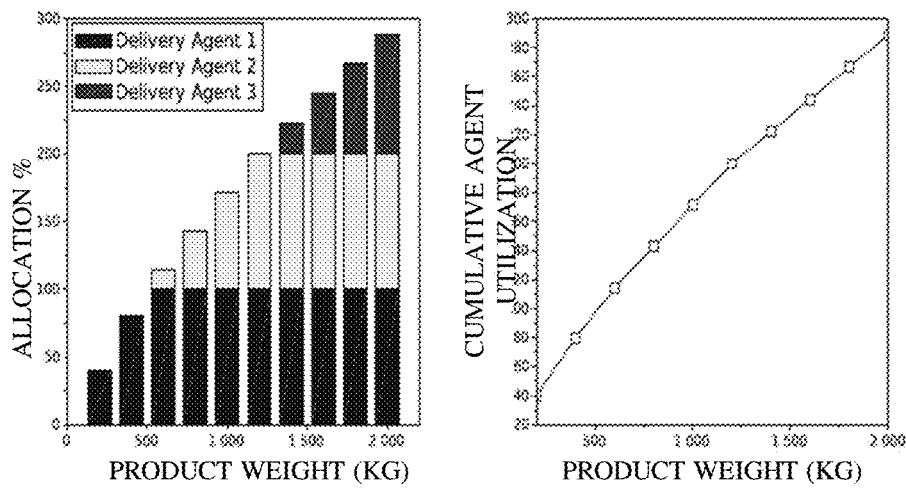
FIG. 5 illustrates graphical representation of allocation ratio to agents and utilization levels using primal-decomposition technique, according to some embodiments of the present disclosure.
Figure 6:
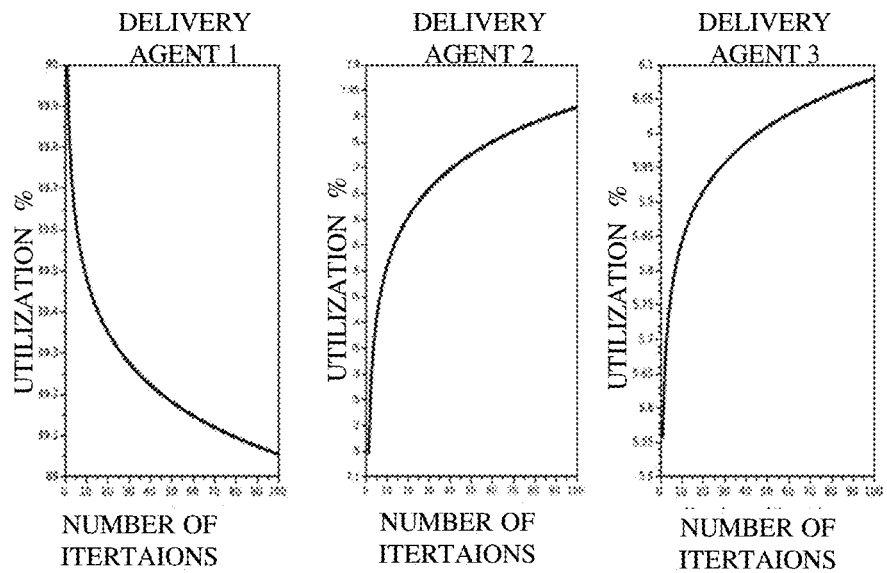
FIG. 6 illustrates a graphical representation of convergence analysis with primal decomposition, according to some embodiments of the present disclosure.

Utilization: In order to maximize utilization of the robotic agents, the primal-decomposition techniques provided in eqs. 11, 12 are deployed. FIG. 5 provides an output of this optimization when applied to increasing demand in products (assumption is that a 50×50 cm product carton weighs 1 kg). As seen from FIG. 5, allocations to the three delivery robotic agents are gradually increased proportionally such that utilization of each delivery robotic agent is maximized. The convergence analysis of primal decomposition (eqs. 11, 12) for one instance is seen in FIG. 6. This demonstrates that the optimization may be accurately decomposed among participating agents.

Figure 7:
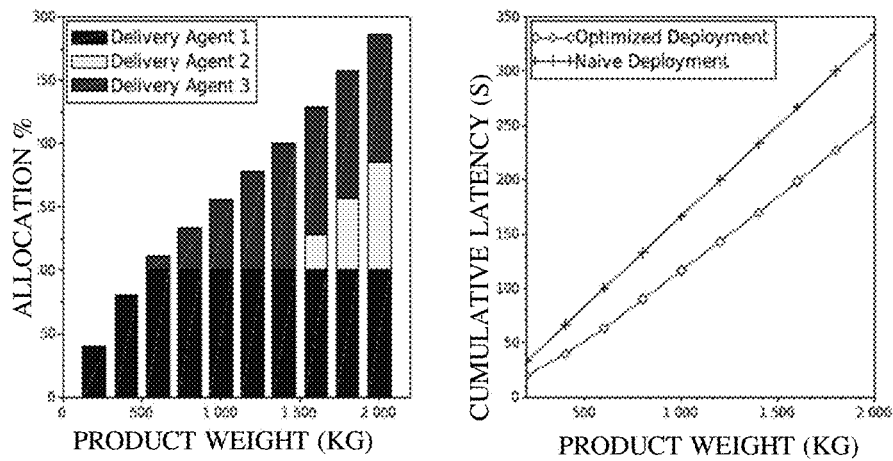
FIG. 7 illustrates graphical representation of allocation ratio to agents and procurement latency using dual-decomposition technique, according to some embodiments of the present disclosure.
Figure 8:
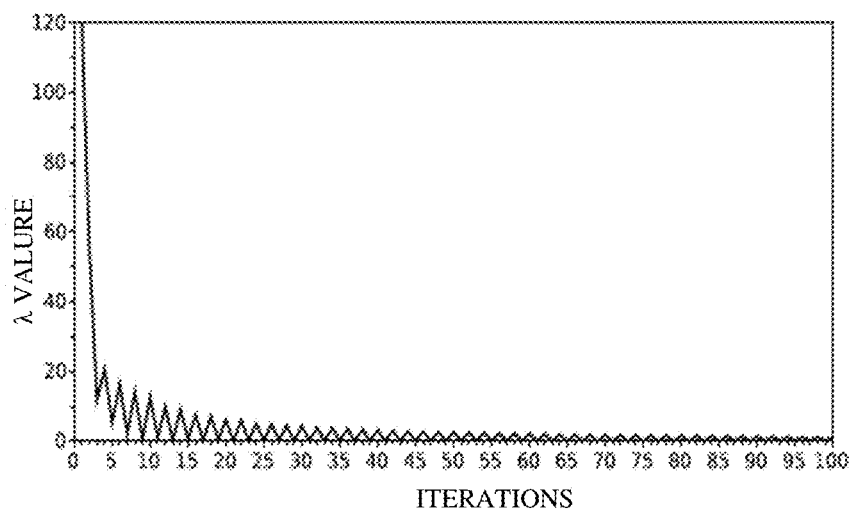
FIG. 8 illustrates a graphical representation of convergence analysis with dual decomposition according to some embodiments of the present disclosure.

Latency: In order to minimize procurement latency of the robotic agents, the dual-decomposition techniques provided in eqs. 13, 14 are deployed. FIG. 7 provides an output of this optimization when applied to increasing demand in products when the delivery robotic agents are randomly placed on the warehouse floor, velocity as specified in Table II. As seen from FIG. 7, allocation provided to the distant robotic agent $a_2$ is minimized so as to maintain acceptable latency. Compared to the naïve deployment (agents randomly allocated), the optimization in FIG. 7 produces a latency improvement of 25% for 2000 kg procurements. The convergence analysis of the dual decomposition variable λ (eqs. 14) is seen in FIG. 8, where convergence to a stable neighborhood is observed within a few iterations.

Figure 9:
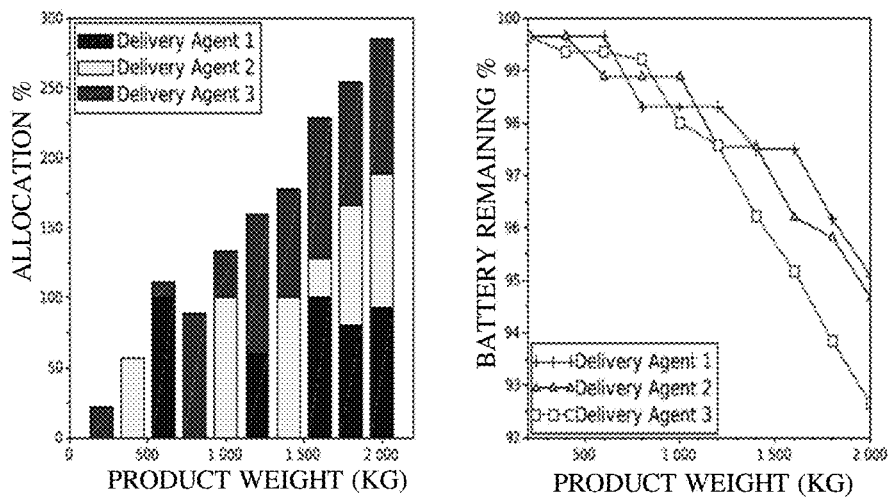
FIG. 9 illustrates graphical representation of allocation ratio to agents and battery degradation using dual-decomposition technique, according to some embodiments of the present disclosure.

Energy: In order to minimize battery degradation of the robotic agents, the dual-decomposition techniques provided in eqs. 16, 17 are deployed. FIG. 9 provides an output of this optimization when applied to KUKA robots with battery specifications in Table II. It is noticed that the variations in allocation ratios such that the battery degradations of each robotic agent is minimized. Energy improvements provided by such optimizations have been reported in our previous work.

Figure 10:
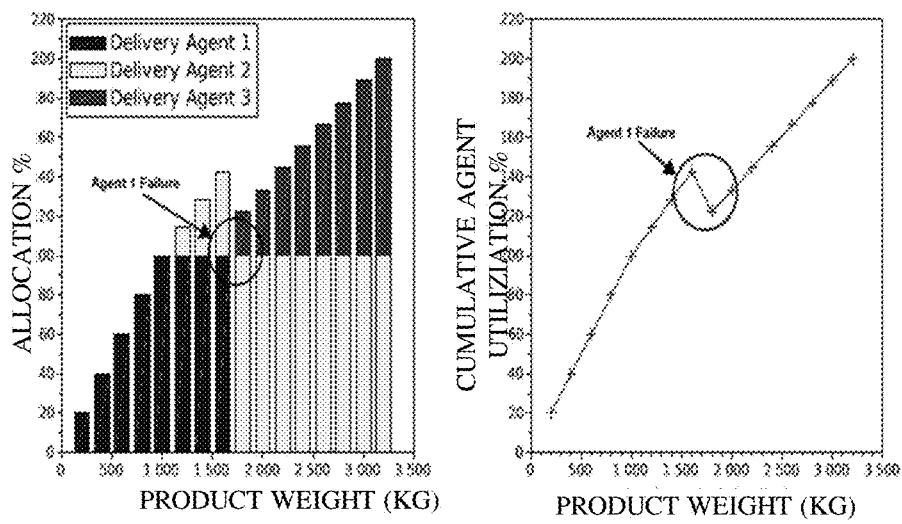
FIG. 10 illustrates graphical representation of allocation ratio to agents and agent failure, according to some embodiments of the present disclosure.

Fault-tolerance: One of the key advantages of moving to an agent based system is fault tolerance. As there is no central entity replicating/check-pointing, the coordinating agent (for example, the coordinating agent 152 illustrated in FIG. 1B) is responsible for varying the primal/dual update factors to take care of faulty robotic agents. As seen in FIG. 10, despite failure of the robotic agent $a_1$, the optimization reconfigures so that higher ratio of products are given to other agents. Herein, any check-pointing (partially completed tasks are not reported) is not performed; rather, the optimization ensures the task is re-distributed to available agents in the next iteration.

Various embodiments disclosed herein describe method and system for optimal allocation of warehouse procurement tasks to distributed robotic agents. The robotic agents coordinate among themselves using distributed optimization techniques, including dual and primal optimization, to allocate tasks within warehouses. The system performs division of tasks based on constraints such as utilization, procurement latency, energy depletion rates and fault tolerance capabilities of robotic agents. Due to the distributed decentralized optimization applied in a multi-agent system, the agents are efficiently enabled utilization, latency and energy resources when traded off with task allocation. Additionally, such a distributed optimization is fault tolerant in nature, striving for completion of tasks, despite failures of robotic agents.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for optimally allocating warehouse procurement tasks to distributed robotic agents, the method comprising:
    obtaining, at a coordinating agent of a plurality of robotic agents, a global task associated with the warehouse and an information associated with the plurality of robotic agents available for the global task, via one or more hardware processors, said information comprising a count and status of the plurality of robotic agents;
    profiling the global task to obtain a set of sub-tasks and identifying one or more constraints associated with the set of sub-tasks, via the one or more hardware processors, a constraint of the one or more constraints comprises one of a utilization constraint and one or more pricing constraints; and
    performing, via the one or more hardware processors, distributed, decentralized optimal task allocation amongst the plurality of robotic agents based at least on the one or more constraints, to obtain optimal performance of the plurality of robotic agents in accomplishment of the global task, the distributed optimal task allocation comprises:
        performing a primal decomposition of the set of sub-tasks by each robotic agent of the plurality or robotic agents and updating a set of corresponding primal variables by the coordinating agent when the optimization is performed based on the utilization constraint, and
        performing a dual decomposition of the set of sub-tasks by each robotic agent of the plurality or robotic agents updating a set of corresponding dual variables by the coordinating agent, when the optimization is performed based on the one or more pricing constraints.

2. The method of claim 1, wherein the warehouse deploys a plurality of autonomous agents, the plurality of autonomous agents include:
    at least one server agent to allocate the global task, and
    the plurality of robotic agents comprising a plurality of delivery agents and a plurality of picker agents for performing the global task, the plurality of delivery agents further comprising a set of coordinating agents for coordination among remaining robotic agents of the plurality of delivery agents to allocate the task to the delivery agents.

3. The method of claim 2, wherein the at least one server agent is capable of:
    selecting a set of tasks from a task queue, each task of the set of tasks corresponds to one of a set of items to be procured from and dropped to a location in the warehouse, wherein each item among the set of items is associated with corresponding item dimensions, weight and location coordinates;

creating an aggregated list of the set of items associated with each task;
categorizing the aggregated list into a set of item lists based on the item dimensions, weight and the location coordinates of each item; and
forwarding a set of subtasks associated with the set of item lists to the plurality of delivery agents, wherein each subtask among the set of subtasks corresponds to procuring/dropping items from an item list from the set of item list.

4. The method of claim 1, wherein the utilization constraint comprises maximization of resource utilization of the plurality of robotic agents.

5. The method of claim 1, wherein the one or more pricing constraints comprises minimization of latency and minimization of energy usage.

6. The method of claim 1, wherein the coordinating agent is configured to provide fault tolerance by redistributing an incomplete task from the global task, discontinued due to a faulty delivery agent, to the remaining delivery agents from the set of delivery agents.

7. A system for optimally allocating warehouse procurement tasks to distributed robotic agents, the system comprising:
one or more memories storing instructions; and
one or more hardware processors coupled to the one or more memories, wherein said one or more hardware processors are configured by said instructions to:
obtain, at a coordinating agent of a plurality of robotic agents, a global task associated with the warehouse and an information associated with the plurality of robotic agents available for the global task, said information comprising a count and status of the plurality of robotic agents;
profile the global task to obtain a set of sub-tasks and identifying one or more constraints associated with the set of sub-tasks, a constraint of the one or more constraints comprises one of a utilization constraint and one or more pricing constraints; and
perform distributed, decentralized optimal task allocation amongst the plurality of robotic agents based at least on the one or more constraints, to obtain optimal performance of the plurality of robotic agents in accomplishment of the global task, the distributed optimal task allocation comprises:
perform a primal decomposition of the set of sub-tasks by each robotic agent of the plurality or robotic agents and updating a set of corresponding primal variables by the coordinating agent when the optimization is performed based on a utilization constraint, and
perform a dual decomposition of the set of sub-tasks by each robotic agent of the plurality or robotic agents and updating a set of corresponding dual variables by the coordinating agent, when the optimization is performed based on one or more pricing constraints.

8. The system of claim 7, wherein the warehouse deploys a plurality of autonomous agents, the plurality of autonomous agents include:
at least one server agent to allocate the global task, and
the plurality of robotic agents comprising a plurality of delivery agents and a plurality of picker agents for performing the global task, the plurality of delivery agents further comprising a set of coordinating agents for coordination among remaining robotic agents of the plurality of delivery agents to allocate the task to the delivery agents.

9. The system of claim 8, wherein the at least one server agent is capable of:
selecting a set of tasks from a task queue, each task of the set of tasks corresponds to one of a set of items to be procured from/and dropped to a location in the warehouse, wherein each item among the set of items is associated with corresponding item dimensions, weight and location coordinates;
creating an aggregated list of the set of items associated with each task;
categorizing the aggregated list into a set of item lists based on the item dimensions, weight and the location coordinates of each item; and
forwarding a set of subtasks associated with the set of item lists to the plurality of delivery agents, wherein each subtask among the set of subtasks corresponds to procuring/dropping items from an item list from the set of item list.

10. The system of claim 7, wherein the utilization constraint comprises maximization of resource utilization of the plurality of robotic agents.

11. The system of claim 7, wherein the one or more pricing constraints comprises minimization of latency and minimization of energy usage.

12. The method of claim 7, wherein the coordinating agent is configured to provide fault tolerance by redistributing an incomplete task from the global task, discontinued due to a faulty delivery agent, to the remaining delivery agents from the set of delivery agents.

13. A non-transitory computer-readable medium having embodied thereon a computer program for executing a method for optimally allocating warehouse procurement tasks to distributed robotic agents, the method comprising:
obtaining, at a coordinating agent of a plurality of robotic agents, a global task associated with the warehouse and an information associated with the plurality of robotic agents available for the global task, via one or more hardware processors, said information comprising a count and status of the plurality of robotic agents;
profiling the global task to obtain a set of sub-tasks and identifying one or more constraints associated with the set of sub-tasks, via the one or more hardware processors, a constraint of the one or more constraints comprises one of a utilization constraint and one or more pricing constraints; and
performing, via the one or more hardware processors, distributed, decentralized optimal task allocation amongst the plurality of robotic agents based at least on the one or more constraints, to obtain optimal performance of the plurality of robotic agents in accomplishment of the global task, the distributed optimal task allocation comprises:
performing a primal decomposition of the set of sub-tasks by each robotic agent of the plurality or robotic agents and updating a set of corresponding primal variables by the coordinating agent when the optimization is performed based on the utilization constraint, and
performing a dual decomposition of the set of sub-tasks by each robotic agent of the plurality or robotic agents updating a set of corresponding dual variables by the coordinating agent, when the optimization is performed based on the one or more pricing constraints.

14. The one or more non-transitory machine readable information storage mediums of claim 13, wherein the warehouse deploys a plurality of autonomous agents, the plurality of autonomous agents include:
  at least one server agent to allocate the global task, and
  the plurality of robotic agents comprising a plurality of delivery agents and a plurality of picker agents for performing the global task, the plurality of delivery agents further comprising a set of coordinating agents for coordination among remaining robotic agents of the plurality of delivery agents to allocate the task to the delivery agents.

15. The one or more non-transitory machine readable information storage mediums of claim 14, wherein the at least one server agent is capable of: selecting a set of tasks from a task queue, each task of the set of tasks corresponds to one of a set of items to be procured from and dropped to a location in the warehouse, wherein each item among the set of items is associated with corresponding item dimensions, weight and location coordinates;
  creating an aggregated list of the set of items associated with each task;
  categorizing the aggregated list into a set of item lists based on the item dimensions, weight and the location coordinates of each item; and
  forwarding a set of subtasks associated with the set of item lists to the plurality of delivery agents, wherein each subtask among the set of subtasks corresponds to procuring/dropping items from an item list from the set of item list.

16. The one or more non-transitory machine readable information storage mediums of claim 13, wherein the utilization constraint comprises maximization of resource utilization of the plurality of robotic agents.

17. The one or more non-transitory machine readable information storage mediums of claim 13, wherein the one or more pricing constraints comprises minimization of latency and minimization of energy usage.

18. The one or more non-transitory machine readable information storage mediums of claim 13, wherein the coordinating agent is configured to provide fault tolerance by redistributing an incomplete task from the global task, discontinued due to a faulty delivery agent, to the remaining delivery agents from the set of delivery agents.

* * * * *